United States Patent
Ismail et al.

(10) Patent No.: US 9,529,351 B2
(45) Date of Patent: Dec. 27, 2016

(54) SYSTEM AND METHOD FOR PARAMETERIZING FIELD DEVICES OF AN AUTOMATION OR CONTROL SYSTEM

(71) Applicant: ABB AG, Mannheim (DE)

(72) Inventors: Muhamad-Ikhwan Ismail, Erlangen (DE); Stefan Gutermuth, Lorsch (DE)

(73) Assignee: ABB AG, Mannheim (DE)

( * ) Notice: Subject to any disclaimer, the term of this patent is extended or adjusted under 35 U.S.C. 154(b) by 405 days.

(21) Appl. No.: 14/148,338

(22) Filed: Jan. 6, 2014

(65) Prior Publication Data

US 2014/0121785 A1 May 1, 2014

Related U.S. Application Data

(63) Continuation of application No. PCT/EP2012/002824, filed on Jul. 5, 2012.

(30) Foreign Application Priority Data

Jul. 6, 2011 (DE) .......... 10 2011 107 321

(51) Int. Cl.
*G06F 3/00* (2006.01)
*G05B 19/18* (2006.01)
(Continued)

(52) U.S. Cl.
CPC ............. *G05B 19/05* (2013.01); *G05B 19/042* (2013.01); *H04L 12/40032* (2013.01);
(Continued)

(58) Field of Classification Search
CPC .................. G05B 19/05; G05B 19/042; G05B 2219/2228; G05B 2219/25083; G05B 2219/25075; H04L 67/34; H04L 12/4035; H04L 12/4625; H04L 12/66; H04L 12/40032; H04L 41/08; H04L 2012/40215; H04L 2012/40221
See application file for complete search history.

(56) References Cited

U.S. PATENT DOCUMENTS 7,246,194 B2 * 7/2007 Train ................. G05B 19/4186
710/305
2003/0135596 A1 7/2003 Moyer et al.
(Continued)

FOREIGN PATENT DOCUMENTS

DE WO 2004038520 A2 * 5/2004 ......... G05B 19/0423
DE 102008038501 A1 2/2010
(Continued)

OTHER PUBLICATIONS

"FG-300 Fieldbus Gateway" by Softing AG, Nov. 2002.*
(Continued)

*Primary Examiner* — Jing-Yih Shyu
(74) *Attorney, Agent, or Firm* — Taft Stettinius & Hollister LLP

(57) ABSTRACT

A system for parameterizing field devices of an automation or control system includes a higher-ranking unit, which is connected via a first communication link based on a first field bus protocol to a communication interface module. The module is connected via a second communication link based on a second field bus protocol to at least one field device. In the higher-ranking unit, sub-blocks are generated and stored from a data structure for configuring the field device that is stored in a device description file for the field device. A first network service transmits the parameters of the field device from the higher-ranking unit via the first communication link into a first functionality of the module that operates as a slave function. A further functionality integrated into the
(Continued)

module evaluates parameters of the field device that are stored in sub-blocks and combines the parameters to form a single configuration block.

18 Claims, 2 Drawing Sheets

(51) Int. Cl.
| | |
|---|---|
| *G05B 19/05* | (2006.01) |
| *H04L 12/40* | (2006.01) |
| *H04L 12/24* | (2006.01) |
| *G05B 19/042* | (2006.01) |
| *H04L 12/403* | (2006.01) |
| *H04L 12/46* | (2006.01) |
| *H04L 12/66* | (2006.01) |
| *H04L 29/08* | (2006.01) |

(52) U.S. Cl.
CPC ...... *H04L 12/4035* (2013.01); *H04L 12/4625* (2013.01); *H04L 12/66* (2013.01); *H04L 41/08* (2013.01); *H04L 67/34* (2013.01); *G05B 2219/2228* (2013.01); *G05B 2219/25075* (2013.01); *G05B 2219/25083* (2013.01); *H04L 2012/40215* (2013.01); *H04L 2012/40221* (2013.01)

(56) References Cited

U.S. PATENT DOCUMENTS

| | | | | |
|---|---|---|---|---|
| 2004/0117465 A1* | 6/2004 | Bodin | ................ | H04L 12/2805 709/222 |
| 2004/0117537 A1* | 6/2004 | Vandensande | ..... | G05B 19/0423 710/305 |
| 2006/0140209 A1* | 6/2006 | Cassiolato | ............ | H04L 12/417 370/466 |
| 2006/0280127 A1* | 12/2006 | Mizuno | ................. | H04L 12/281 370/254 |
| 2009/0161565 A1* | 6/2009 | Reniere | ................... | H04L 12/66 370/249 |
| 2010/0100198 A1* | 4/2010 | Hermann | ........... | G05B 19/0426 700/11 |
| 2010/0121999 A1 | 5/2010 | Isenmann et al. | | |
| 2012/0151017 A1* | 6/2012 | Naismith | .......... | H04L 12/40169 709/220 |

FOREIGN PATENT DOCUMENTS

| | | |
|---|---|---|
| EP | 2187571 A1 | 5/2010 |
| WO | WO 2007/071212 A1 | 6/2007 |

OTHER PUBLICATIONS

"Remotely Parameterizing Process Field Devices" from Softing AG, Aug. 2012.*

"Control Engineering;"Comact Ethernet-to-fieldbus gateway; Control Engineering; Sep. 1, 2000; available online athttp://www.controleng.com/single-article/compact-ethernet-to-fieldbus-gateway/3f3b163e33dc8f596dbe2ec7dbbc4cb7.html.*

"Field Automation with ProFIBUS and SIMATIC PCS 7" by Simens, Apr. 2003.*

International Search Report (PCT/ISA/210) mailed on Aug. 23, 2012, by the European Patent Office as the International Searching Authority for International Application No. PCT/EP2012/002824.

German Search Report issued Mar. 2, 2012 for German Application No. 102011107321.7.

\* cited by examiner

SYSTEM AND METHOD FOR PARAMETERIZING FIELD DEVICES OF AN AUTOMATION OR CONTROL SYSTEM

RELATED APPLICATIONS

This application claims priority as a continuation application under 35 U.S.C. §120 to PCT/EP2012/002824, which was filed as an International Application on Jul. 5, 2012 designating the U.S., and which claims priority to European Application 10 2011 107 321.7 filed in Europe on Jul. 6, 2011. The entire contents of these applications are hereby incorporated by reference in their entireties.

FIELD

The present disclosure relates to a system and a method for parameterizing field devices of an automation or control system.

BACKGROUND INFORMATION

Automation systems for controlling a technical process or a technical installation can include a central control unit. The central control unit communicates with the input/output units and/or field devices of the automation system via a communication interface module (also referred to as a gateway device). In this case, the gateway device makes it possible for field buses of different protocols to communicate.

In case high-speed Ethernet buses are used in process automation at the guidance system level, the gateway device operates as a mediation element between the guidance system level, at which the data are transmitted at transmission rates of 10 Mbits/s, and the field level, at which communication, for example for field bus protocols, is effected at a transmission rate of 1.2 kbits/s. Whereas the gateway device has the function of a slave at the guidance system level, it has the function of a master at the field level.

The gateway devices used in automation or control systems can be connected to the superordinate control unit via a first bus and communicate with the field devices via a second bus. For communication between field bus systems which process different protocols, the gateway device communicates with the central control unit using an Ethernet-based or Profinet protocol, for example, and communicates with input/output devices and/or field devices connected thereto using a field bus protocol, for example, CAN (Controller Area Network) or CANopen.

So that the inputs and outputs of the system hardware can be addressed, the devices used in the system must be configured and parameterized according to the respective customer-specific requirements. The parameterization and configuration method is described in IEC 61131-3, for example.

In order to configure and parameterize a field device, provision is made for a device description file which is transmitted to the field device. The device description file includes, for example, device-specific information for drives, instrumentation for positioning states, pressure, temperature and/or flow rate measurements and low-voltage switchgear as well as functionalities of the field devices which relate to the entire life-cycle of the devices.

The devices connected to the gateway device can be parameterized using additional interfaces which are integrated in the gateway device and are configured and parameterized using a user program, for example.

For this purpose, serial interfaces which can be in the form of RS232, /RS422 and/or RS485 interfaces, for example, are provided in the gateway device and are used to load the device description files containing the corresponding parameters into the flash memory of the gateway device, for example. The gateway device can also be connected, via a USB interface, to a computer which can be used to parameterize the field devices.

However, complete parameterization of the field devices connected to the gateway device is not provided via the first high-performance Ethernet bus or Profibus.

SUMMARY

An exemplary embodiment of the present disclosure provides a system for parameterizing field devices of an automation or control system. The exemplary system includes a superordinate unit, and a communication interface module connected to the superordinate unit via a first communication link based on a first field bus protocol. The communication interface module is connected to at least one field device via a second communication link based on a second field bus protocol. The superordinate unit is configured to generate sub-blocks from a data structure for parameterizing the at least one field device. The data structure is stored in a device description file for the at least one field device. The superordinate unit is configured to store the sub-blocks in the superordinate unit. A first network service is configured to transmit parameters of the at least one field device, which are stored in the sub-blocks, from the superordinate unit to a first functionality of the communication interface module, which operates as a slave function, via the first communication link. A further functionality integrated in the communication interface module is configured to evaluate the parameters of the at least one field device, which are stored in the sub-blocks, combine the parameters to form a single configuration block, loads the combined configuration block into a field bus master stack of the communication interface module, and transmit the configuration block to the at least one field device via a second functionality of the communication interface module, which operates as a master function, using a second network service via the second communication link.

An exemplary embodiment of the present disclosure provides a method for parameterizing field devices of an automation or control system having a superordinate unit which is connected to a communication interface module via a first communication link based on a first field bus protocol and having at least one field device which is connected to the communication interface module via a second communication link based on a second field bus protocol. The exemplary method includes generating sub-blocks from a data structure for parameterizing the at least one field device, where the data structure is stored in a device description file for the at least one field device. The exemplary method also includes transmitting, by a first network service, the sub-blocks from the superordinate unit to a first functionality of the communication interface module, which operates as a slave function, via the first communication link. In addition, the exemplary method includes evaluating, by a further functionality of the superordinate unit, the parameters of the at least one field device, which are stored the in sub-blocks, and combining the parameters to form a single configuration block. Furthermore, the exemplary method includes loading the combined configuration block into a field bus master stack of the communication interface module, and transmitting the combined configuration block to the at least one field device via a second functionality of the communication interface module, which operates as a master function, using a second network service via the second communication link.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
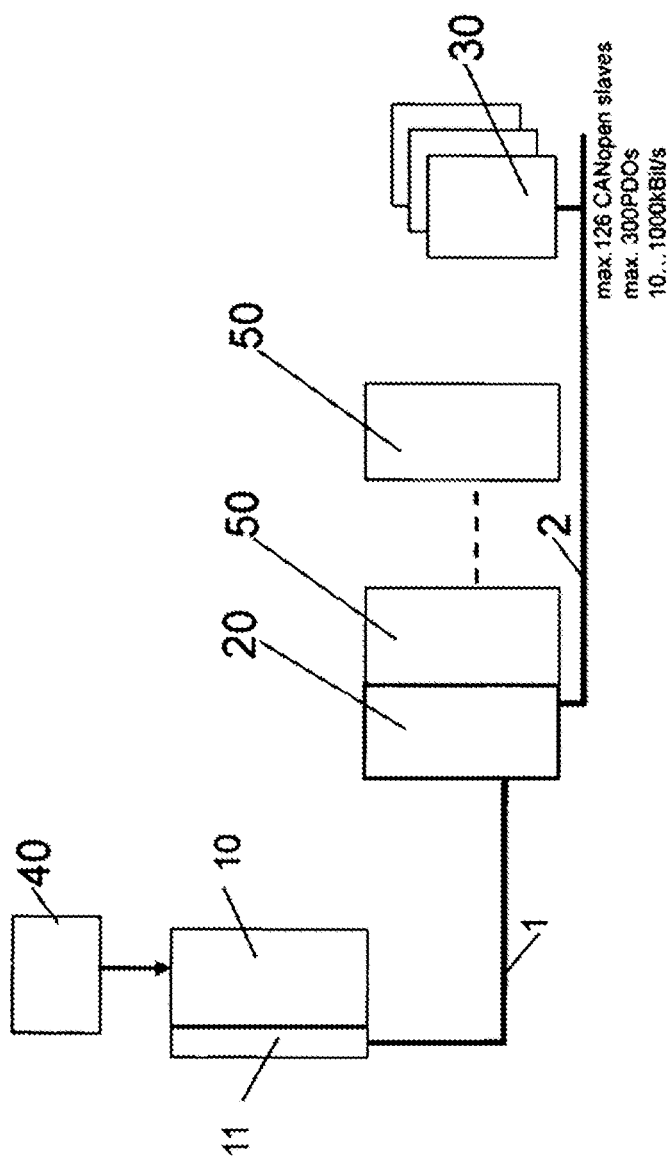
FIG. 1 shows an excerpt of a control system according to an exemplary embodiment of the present disclosure for parameterizing a multiplicity of field devices via a superordinate control unit.

Exemplary embodiments of the present disclosure provide a system and method for parameterizing field devices of an automation or control system. The system and method of the present disclosure simplify the parameterization of the devices of the control or automation system, and complete parameterization of field devices connected to a gateway device can be carried out using a high-performance Ethernet bus or Profibus.

The system and method provide for the parameterizing and/or configuring of field devices of an automation or control system via a communication interface module (also referred to as a gateway device) which is provided for connecting field devices to a superordinate control unit via a bus system, and for coupling at least two field bus systems.

The system and method according to the present disclosure are configured for use in automation or control systems of process automation or machine control.

Features of the present disclosure will be described hereinafter with respect to the functions the devices of the system are configured to perform. It is to be understood that each of the devices of the present disclosure can include a processor (e.g., a general processor or an application specific processor) that is configured to execute a computer program tangibly recorded in a non-transitory computer-readable recording medium (e.g., a non-volatile memory such as a ROM, hard disk drive, flash memory, optical memory, etc.) resident in the device that, when executed by the processor, causes the processor of the respective device to carry out the operative functions of the device as described herein. The elements of the system as described herein are to be understood as each constituting a hardware device of the system. The devices may be described as units, master, slave, modules and/or systems. Such systems (e.g., a guidance system) are sub-systems of the automation or control system of the present disclosure. The devices can be stand-alone devices or can be combined and/or integrated with other devices to carry out the operative features as described herein.

The system according to the present disclosure for parameterizing and configuring field devices of an automation or control system includes a superordinate unit, for example, a control unit (PLC) or a guidance system, which operates as a master and is connected to a communication interface module via a first communication link based on a first field bus protocol. The master controls the data transmission slave device which is connected thereto and has access to the network of the automation or control system.

The communication interface module is connected to at least one field device operating as a slave via a second communication link based on a second field bus protocol.

The data structure for parameterizing the field device is stored in a device description file.

After, for example, three primary sub-blocks have been generated from the device description file of the field device, the device description file which now includes the sub-blocks is stored in the superordinate unit. However, more than three primary sub-blocks can also be generated. This is helpful, for example, when the secondary field bus requires this, for example, for special configurations.

According to an exemplary embodiment, the device description file can be broken down into sub-blocks or partial configurations since it is possible for a sub-block/partial configuration to be too large or for other partial configurations to no longer fit in the same block (e.g., owing to a restriction in the primary bus with respect to the maximum block size).

As a result of the fact that the device description file can be broken down into sub-blocks, configuration errors can be advantageously discovered more quickly as a result of a better analysis possibility.

In the example of three primary sub-blocks, the first block can include information relating to the network configuration and/or transmission technology of the slave device for the second field bus protocol, for example, information relating to network addresses and transmission speed. The second block can include information relating to the internal device configuration of the slave device, for example, the configuration of the cyclical real-time data, the configuration of the analog channels, and the behavior of the safety-oriented inputs/outputs. The third block can include the configuration of the process image, for example, the image and number of inputs/outputs.

A first network service transmits the parameters of the field device, which, according to the above example, are stored in the three sub-blocks, from the superordinate unit to a first functionality of the communication interface module, which operates as a slave function, via the first communication link.

A further functionality integrated in the communication interface module evaluates the parameters of the field device, which are stored in the sub-blocks, and combines and/or converts the three sub-blocks to form a single configuration block. This is carried out in the gateway functional unit which is responsible for transmitting data/configuration/services between primary and secondary buses.

After the combined configuration block has been loaded into a field bus master stack of the communication interface module, a second functionality of the communication interface module, which operates as a master function, transmits the previously produced configuration block (which can also be referred to as the standard configuration of the field device) to the field device via the second communication link using a second network service. A stack relates to a communication software package which implements the ISO/OSI layers according to IEC 61131-3 which are used in a device, for example. The secondary bus (master function) is therefore implemented in the form of solitary SW modules which are referred to as a stack.

The communication interface module has the function of a slave with respect to the superordinate unit at the superordinate level and has the function of a master with respect to the field devices at the field level. In this case, the communication interface module undertakes communication between the field devices connected thereto and the superordinate control system using the first high-performance communication link in the form of a slave connection, and undertakes communication between the field devices connected to the second bus using the second communication link which is integrated in the communication interface module and is in the form of a master connection. The master and slave connections for interchanging data between the field devices via the bus system are implemented using previously mentioned special software and/or hardware modules.

In accordance with an exemplary embodiment of the system according to the present disclosure, the communication interface module communicates with the superordinate unit using a high-performance (e.g., high-speed) Ethernet, Profinet or Profibus protocol and communicates with the field devices (e.g., field devices 30 in FIG. 1) using the CAN and/or CANopen field bus protocol.

In this case, one sub-block includes the device network configuration containing the CANopen node ID of the device connected to CANopen, the synchronizing message (SYNC) and the node-guarding function and the monitoring function setting (heartbeat settings) for the device operating as a slave and is transmitted, for example, with a Profinet acyclic service under index 1. The synchronizing message SYNC is used to denote a CANopen frame which determines the bus cycle and synchronizes the slaves. The node-guarding/heartbeat settings relate to the configuration for bus monitoring in CANopen.

If the node-guarding option is activated, a message is sent to the device. If the device then does not answer with the stated guard COB-ID (Communication Object Identifier), it receives a timeout status. If the number of attempts (life time factor) is reached, the module is considered to be not OK. The status of the module is stored at a diagnostic address. If a guard time and a life time factor are not stated, the module is not monitored.

If the "heartbeat production" option is activated, the device emits so-called heartbeats at the (e.g., ms) intervals stated in the heartbeat producer time. If the "activate heartbeat consumption" option is activated, the module listens for heartbeats transmitted by the master. As soon as such heartbeats are no longer received, the device switches off the inputs/outputs.

A further sub-block includes the device-internal configuration containing the service data objects SDO for parameterizing object directory entries for the CANopen slave device and is transmitted with a Profinet acyclic service under index 2.

A third sub-block includes the configuration of the process image containing the process data objects (P DO) for transporting real-time data for the CANopen slave device and is transmitted with a Profinet acyclic service under index 3.

The communication interface module reads and records all three sub-blocks, evaluates the sub-blocks and converts them into a complete parameter block for the internal CANopen master, with the result that the CANopen slave can be configured without additional coupling via a third bus.

The module according to the present disclosure therefore considerably reduces the device costs of the automation or control system since the input units, output units or else input and output units which may be in the form of separate devices are saved as a result of their functions being implemented in the communication interface module according to the present disclosure, and the field devices can therefore be directly connected to the gateway device without an additional bus.

According to an exemplary embodiment, the system and method of the present disclosure advantageously enable parameterization, for example of the number of inputs and/or outputs, as well as use as digital or analog inputs and/or outputs and the stipulation of their adjustment ranges using the existing communication links without additionally connecting the field devices to an operating device, for example via a serial interface in the form of an RS232, /RS422 and/or RS485 interface.

An exemplary embodiment of the present disclosure also provides a method for parameterizing field devices of the automation or control system. The method according to the disclosure is based on a superordinate unit being connected to a communication interface module via a first communication link based on a first field bus protocol, and the communication interface module being connected to at least one field device via a second communication link based on a second field bus protocol.

Sub-blocks are generated from the data structure for parameterizing the field device, which is stored in a device description file for the field device. The generated sub-blocks are transmitted from the superordinate unit to a first functionality of the communication interface module, which operates as a slave function, via the first communication link using a first network service, and are evaluated and combined to form a single configuration block using a further functionality.

The combined configuration block is then loaded into a field bus master stack of the communication interface module, and the configuration block is transmitted to the field device via a second functionality of the communication interface module, which operates as a master function, using a second network service via the second communication link.

The control system illustrated in FIG. 1 includes a superordinate control unit 10 which operates as a master and is in the form of a programmable logic controller (PLC), for example.

The PLC 10 is connected to a gateway device 20 via its communication module 11 and a first communication link 1 based on a first field bus protocol. In this case, the gateway device 20 makes it possible for field buses 1, 2 of different protocols, for example Profinet and CAN or CANopen, to communicate.

The gateway device 20 includes a first functional unit which handles communication with the control unit 10 using the Profinet field bus protocol 1 and a second functional unit for communicating with CAN-compatible or CANopen-compatible field devices 30, which are connected thereto and operate as a slave, using the CAN or CANopen field bus protocol 2.

In accordance with an exemplary embodiment of the control system illustrated in FIG. 1, further field devices 50 can optionally be connected to a third functional unit which is integrated in the gateway device 20 and has input and/or output functionalities. The functions of the input/output units which are usually in the form of separate devices can be integrated in the gateway device 20 according to the present disclosure using the third functional unit.

According to an exemplary embodiment of the present disclosure, a device description file 40 which contains the parameters of the slave device which are intended for the second field bus protocol 2 is broken down into, for example, three sub-blocks and is intended to be transmitted to the first field bus device using the first field bus protocol 1. In the example of three sub-blocks, the first block includes information relating to the network configuration/transmission technology of the slave device for the second field bus protocol 2, the second block includes information relating to the internal device configuration of the slave device, and the third block includes the configuration of the device process image.

Figure 2:
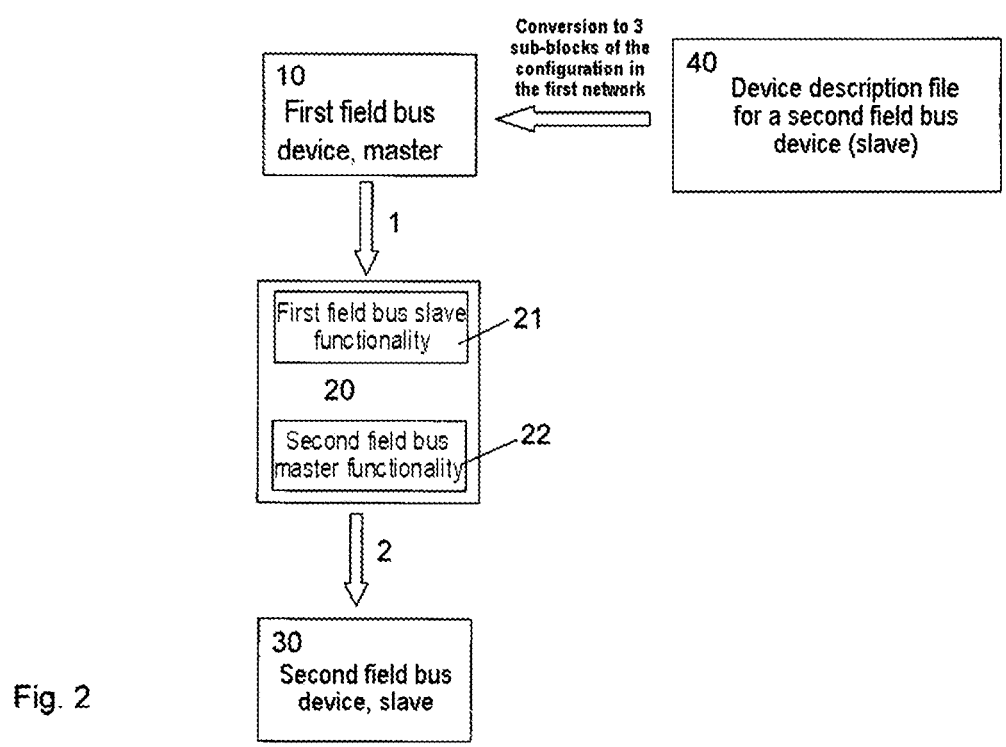
FIG. 2 shows an exemplary method sequence for parameterizing field devices of the automation or control system.

FIG. 2 shows a method sequence for parameterizing the field devices 30 of the automation or control system which operate as a slave, according to an exemplary embodiment of the present disclosure. A first network service transmits the parameters of the field device 30, which are stored in the three sub-blocks, from the PLC 10 to the first functionality 21 of the gateway device 20, which operates as a slave function, via the first communication link 1 based on the Profinet field bus protocol 1.

A further functionality integrated in the gateway device 20 evaluates the parameters of the field device 30, which are stored in the three sub-blocks, and combines the parameters to form a single configuration block.

The combined configuration block is then loaded into a field bus master stack of the gateway device 20 and is transmitted to the field device 30 via a second functionality 22 of the gateway device 20, which operates as a master function, using a second network service via the second communication link 2.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for parameterizing field devices of an automation or control system, the system comprising:
   a superordinate unit; and
   a communication interface module connected to the superordinate unit via a first communication link based on a first field bus protocol, the communication interface module being connected to at least one field device via a second communication link based on a second field bus protocol, wherein:
   the superordinate unit is configured to generate sub-blocks from a data structure for parameterizing the at least one field device, the data structure being stored in a device description file for the at least one field device, and store the sub-blocks in the superordinate unit;
   a first network service is configured to transmit parameters of the at least one field device, which are stored in the sub-blocks, from the superordinate unit to a first functionality of the communication interface module, which operates as a slave function, via the first communication link;
   a further functionality integrated in the communication interface module is configured to evaluate the parameters of the at least one field device, which are stored in the sub-blocks, combine the parameters stored in the side-blocks to form a single configuration block having the parameters of the sub-blocks stored therein, loads the combined configuration block into a field bus master stack of the communication interface module, and transmit the combined configuration block to the at least one field device via a second functionality of the communication interface module, which operates as a master function, using a second network service via the second communication link.

2. The system as claimed in claim 1, wherein the communication interface module is configured to communicate with the superordinate unit using a high-performance protocol including one of Ethernet, Profibus and Profinet protocols.

3. The system as claimed in claim 1, wherein the communication interface module is configured to communicate with the at least one field device using one of the CAN (Controller Area Network) field bus protocol and the CANopen field bus protocol.

4. The system as claimed in claim 1, wherein a first one of the sub-blocks comprises information relating to a network configuration of the at least one field device for the second field bus protocol.

5. The system as claimed in claim 4, wherein the first one of the sub-blocks comprises information relating to network addresses and transmission speed.

6. The system as claimed in claim 1, wherein a second one of the sub-blocks comprises information relating to an internal device configuration of the at least one field device.

7. The system as claimed in claim 6, wherein the second one of the sub-blocks comprises information relating to at least one of a configuration of cyclical real-time data, a configuration of analog channels, and a behavior of safety-oriented inputs/outputs.

8. The system as claimed in claim 1, wherein a third one of the sub-blocks comprises a configuration of a device process image.

9. The system as claimed in claim 8, wherein the third one of the sub-blocks comprises an image and number of inputs and outputs.

10. The system as claimed in claim 4, wherein a second one of the sub-blocks comprises information relating to an internal device configuration of the at least one field device.

11. The system as claimed in claim 10, wherein the second one of the sub-blocks comprises information relating to at least one of a configuration of cyclical real-time data, a configuration of analog channels, and a behavior of safety-oriented inputs/outputs.

12. The system as claimed in claim 10, wherein a third one of the sub-blocks comprises a configuration of a device process image.

13. The system as claimed in claim 12, wherein the third one of the sub-blocks comprises an image and number of inputs and outputs.

14. The system as claimed in claim 1, wherein the superordinate unit is one of a control unit and a guidance system.

15. The system as claimed in claim 1, wherein the communication interface module has the function of a slave with respect to the superordinate unit at a superordinate level and has the function of a master with respect to the at least one field device at a field level.

16. The system as claimed in claim 13, wherein the communication interface module has the function of a slave with respect to the superordinate unit at a superordinate level and has the function of a master with respect to the at least one field device at a field level.

17. An automation or control system of at least one of process automation control and machine control comprising the system as claimed in claim 1.

18. A method for parameterizing field devices of an automation or control system having a superordinate unit which is connected to a communication interface module via a first communication link based on a first field bus protocol and having at least one field device which is connected to the communication interface module via a second communication link based on a second field bus protocol, the method comprising:

generating sub-blocks from a data structure for parameterizing the at least one field device, the data structure being stored in a device description file for the at least one field device, transmitting, by a first network service, the sub-blocks from the superordinate unit to a first functionality of the communication interface module, which operates as a slave function, via the first communication link, evaluating, by a further functionality of the communication interface module, the parameters of the at least one field device, which are stored the in sub-blocks, and combining the parameters stored in the sub-blocks to form a single configuration block having the parameters of the sub-blocks stored therein;

loading the combined configuration block into a field bus master stack of the communication interface module; and transmitting the combined configuration block to the at least one field device via a second functionality of the communication interface module, which operates as a master function, using a second network service via the second communication link.

* * * * *